US007260303B2

(12) United States Patent
Bench et al.

(10) Patent No.: US 7,260,303 B2
(45) Date of Patent: Aug. 21, 2007

(54) SYSTEMS, DEVICES AND METHODS FOR THERMAL TESTING OF AN OPTOELECTRONIC MODULE

(75) Inventors: Samantha R. Bench, Whitefish, MT (US); John C. Dirkson, Santa Clara, CA (US); Darin James Douma, Monrovia, CA (US)

(73) Assignee: Finisar Corporation, Sunnyvale, CA (US)

( * ) Notice: Subject to any disclaimer, the term of this patent is extended or adjusted under 35 U.S.C. 154(b) by 82 days.

(21) Appl. No.: 11/027,765

(22) Filed: Dec. 30, 2004

(65) Prior Publication Data

US 2005/0152663 A1 Jul. 14, 2005

Related U.S. Application Data

(60) Provisional application No. 60/534,046, filed on Jan. 2, 2004.

(51) Int. Cl.
*G02B 6/00* (2006.01)
*G02B 6/36* (2006.01)

(52) U.S. Cl. ..................... 385/147; 385/134

(58) Field of Classification Search ............... 385/134, 385/147
See application file for complete search history.

(56) References Cited

U.S. PATENT DOCUMENTS

2005/0025449 A1* 2/2005 Dirkson et al. ............. 385/147

* cited by examiner

*Primary Examiner*—Kevin S Wood
(74) *Attorney, Agent, or Firm*—Workman Nydegger (57) ABSTRACT

Devices, systems and methods for thermal testing of optoelectronic modules are disclosed. The device includes a frame member, a thermoelectric cooler, a plate in thermal contact with the DUT, a heat sink in thermal contact with the frame, and a metallic clip for attaching the thermal testing device to the module (DUT). The clip secures the thermoelectric cooler to the DUT. The method includes the steps of providing a testing apparatus having a printed circuit board with a test circuit formed thereon. The test board also has an electrical interface disposed in electrical communication with the test circuit, and a thermal testing assembly. A temporary electrical connection is formed between the DUT device and the interface. The thermal testing assembly is used to maintain a test temperature of the DUT device. A data stream is transmitted through the DUT device and then evaluated for adherence to a defined specification.

12 Claims, 7 Drawing Sheets

SYSTEMS, DEVICES AND METHODS FOR THERMAL TESTING OF AN OPTOELECTRONIC MODULE

CROSS-REFERENCE TO RELATED APPLICATIONS

This application claims priority to and the benefit of U.S. Provisional Patent Application No. 60/534,046, filed on Jan. 2, 2004, and entitled "Thermal Testing Assembly for Optoelectronic Module", which is incorporated herein by reference in its entirety.

BACKGROUND

1. The Field of the Invention

The present invention relates generally to the field of optoelectronic devices, and more particularly, to systems, devices and methods for temperature cycle testing of optoelectronic transceiver modules.

2. Related Technology

Optoelectronic transceiver modules are commonly employed in fiber optic data transmission networks in the transmission and receipt of binary data signals. Among other things, an optoelectronic transceiver includes an optical transmitter, such as a laser, that receives electrical data signals, translates the electrical data signals to optical data signals, and then transmits the optical data signals. Further, the optoelectronic transceiver also includes an optical receiver, such as a photodiode, that receives optical data signals, translates the optical data signals to electrical data signals, and then transmits the electrical data signals. Optoelectronic transceivers can also include a printed circuit board (PCB) containing various control circuitry for the optical transmitter and/or optical receiver.

When manufacturing optoelectronic transceiver modules, each transceiver is tested to ensure that it functions properly. Since optoelectronic transceivers operate in environments characterized by any number of varying conditions, such as temperature and supply voltage for example, the transceivers are typically tested under conditions similar to those likely to be experienced in the intended operating environment.

However, for a number of reasons, testing optoelectronic transceiver modules has proven to be a costly activity. One reason for this is that optoelectronic transceivers are not readily disassembled or repaired once their components have been assembled. In this regard, it is generally the case that an optoelectronic transceiver will malfunction if there is a defect in the electrical component, such as the PCB, either of the optical components, or the connections between components. Thus, correction of the problem or defect often requires disassembly of the transceiver which, as noted above, can be difficult and, accordingly, rather costly.

Additionally, one of the aspects of the optoelectronic module that can be tested is the ability of the module to function over a wide temperature range. Typically, this has been accomplished by attaching the module to a testing board and placing the entire test board and module combination into an oven for testing over a range of temperatures. This approach to testing has proved problematic. For example, the printed circuit boards used as the testing boards are not designed to operate in the same temperature range as the optoelectronic modules. Therefore, when these boards are heated, they frequently fail, resulting in increased time and expense to conduct the tests on the modules, as well as time and expense to repair any damage to the test boards. Also, precise control of the module temperature is difficult to achieve in the oven due to variables such as the presence of air currents within the oven.

One approach to such problems has been to test the optoelectronic module components individually, and then assemble the module. While such an approach may help to eliminate the problem of determining which particular component is malfunctioning when the module is tested as a whole, such an approach may not provide useful information concerning the performance of the assembled module. Rather, the module must still be tested after final assembly to ensure that all connections are working properly. Thus, typical testing evolutions have involved a time consuming, and expensive, two step testing process where the module was tested firstly in the oven at one temperature and then secondly in the oven at a second temperature.

BRIEF SUMMARY OF THE EMBODIMENTS

In view of the foregoing, and other problems in the art, what is needed are systems, methods and devices for testing optoelectronic modules that eliminate, or at least attenuate, the problems discussed above. Among other things, such systems, methods and devices should enable module-specific thermal testing over a desired temperature range. The systems should allow the operating environment of the modules to be easily changed to make the testing process fast and efficient. Such systems, devices and methods are disclosed herein.

One exemplary embodiment of the present invention provides a thermal testing assembly that is suitable for thermal testing and cycling of components, such as optoelectronic modules. Exemplarily, the thermal testing assembly can include a cover, a thermoelectric cooler ("TEC") attached to the cover, a cover plate that comes into contact with the module, and a metallic clip attached to the cover plate. The metallic clip can be configured to enable removable attachment of the thermal testing assembly to a cage within which the device under test (DUT) is disposed. The TEC is thus arranged for substantial thermal contact with the cage and the DUT. Additionally, a temperature sensor can be provided and attached indirectly to the DUT to enable collection of feedback data concerning the temperature of the module. Finally, a heat sink can be provided on top of the frame to help maintain the temperature differential needed by the TEC.

In the operation of the thermal testing assembly, a temporary electrical connection can be formed between the optoelectronic device under test, and an electrical interface included in the board upon which the cage resides. Following connection, power is applied to the TEC to bring the DUT to a desired temperature. The thermal testing assembly then maintains the test temperature of the DUT at a desired temperature, or within a desired temperature range. In some exemplary embodiments, this temperature range can be about −40 degrees C. (° C.) to about 100° C. Once the DUT reaches the desired temperature, a data stream is transmitted through the optoelectronic device and evaluated for conformance with a defined specification. The specification can include, by way of example and not limitation, those operating parameters specified by the current XFP Multi-Source Agreement (MSA) Specification, SONET OC-192 SR-1 and SDH STM I-64.1 specifications, as well as the 10-Gigabit Ethernet, IEEE 802.3ae, 10GBASE-LR/LW, and 10G Fibre Channel specifications.

In this way, the thermal testing assembly enables full data rate testing of the DUT over a defined operating temperature range, at data rates ranging from, for example, about 1 Gb/s to about 11 Gb/s. This helps to ensure that transceivers that are shipped to customers will perform as specified, thus greatly reducing module failures and increasing customer satisfaction. Moreover, the need to thermally cycle the entire testing board with which the optoelectronic device is associated is substantially eliminated.

One exemplary method for testing an electronic, optical, or optoelectronic device can include a first optional step for preheating the device to a desired testing temperature. Once preheated, the device can be placed in a thermal testing assembly and electrical and/or optical connections to a testing device are made. The thermal testing assembly can be identical to or similar to the testing assembly described above. The next step is to bring the device to a desired testing temperature, or, if preheated, maintaining the device at that temperature. A data stream can then be transmitted from the testing assembly through the device under test. Finally, the data stream can be evaluated according to one or more predefined standards, such as those discussed above.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other aspects of embodiments of the present invention, a more particular description of the invention will be rendered by reference to specific embodiments thereof which are illustrated in the appended drawings. These drawings depict only exemplary embodiments of the invention and are, therefore, not to be considered limiting of the scope of the invention. The invention will be described and explained with additional specificity and detail through the use of the accompanying drawings in which.

DETAILED DESCRIPTION OF THE EMBODIMENTS

Embodiments of the present invention relate to devices, systems and methods used in the thermal testing of optical, electronic, or optoelectronic devices, such as, but not limited to, optoelectronic transceiver modules. Embodiments of the invention enable module-specific thermal testing by way of a portable thermal testing assembly. The thermal testing assembly can be incorporated into an exemplary testing system. The resulting system and corresponding method allow modules to be tested over a wide temperature range. Additionally, some embodiments of the testing assembly systems and methods allow many modules to be tested in a shorter amount of time than prior systems and methods.

Figure 1:
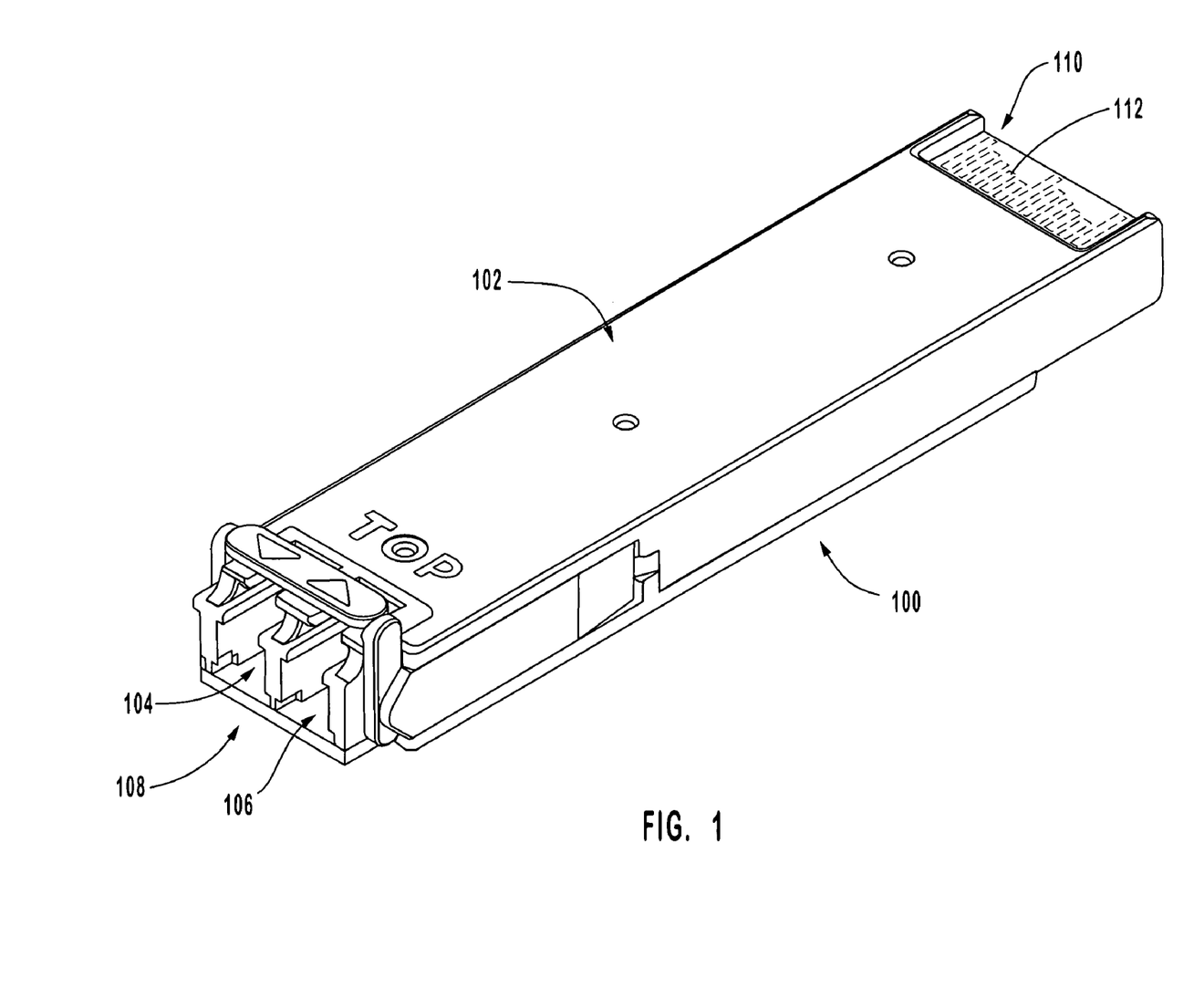
FIG. 1 shows a perspective schematic view of an exemplary optoelectronic transceiver module such as may be evaluated with a thermal testing assembly.

A typical module, such as can be tested using embodiments of the present invention, is shown in FIG. 1 and designated generally as reference numeral 100. Module 100 is exemplarily implemented as an optoelectronic module. It should be noted however, that embodiments of the invention are not constrained solely for use in testing optoelectronic modules. Rather, exemplary embodiments of the invention may be used in any testing evolution or test setup where the functionality disclosed herein may prove useful. For example, electronic modules, optical modules, and other types of electronic or optoelectronic devices can be tested using the devices and methods disclosed herein. Accordingly, the scope of the invention should not be construed to be limited to the exemplary test evolutions and test setups, nor to the exemplary devices under test, that are discussed herein.

With continuing reference to FIG. 1, the module 100 has a housing 102 which exemplarily includes a one piece metal housing, but other materials and methods of construction can also be employed. In alternate exemplary embodiments, housings having more than one piece, and/or that are constructed from nonmetallic materials, can also be used. In one exemplary embodiment, the module 100 can be a 10 Gigabit per second (Gb/s) small form-factor pluggable (XFP) module. However, as noted earlier, exemplary embodiments of the invention may be usefully employed with a wide variety of other components as well, such as, but not limited to, SFF, SFX, SFP, GBIC, and AT modules.

Disposed within the housing 102 are various optoelectronic components adapted to implement the functionality associated with the module 100. Exemplarily, a first optical sub-assembly (OSA) 104 and a second OSA 106 are located side by side near a front end 108 of the housing 102. Of course, the OSAs may be arranged in other ways as well. Moreover, fewer or more OSAs may be employed in exemplary optoelectronic modules.

In the exemplary illustrated implementation, one OSA can be a "receive" OSA (ROSA), while the other OSA can be a "transmit" OSA (TOSA), although both OSAs 104, 106 may be of the same type in some applications. In general, the ROSA receives an input optical data signal and converts the input optical data signal into an output electrical data signal. Conversely, the TOSA receives an input electrical data signal and converts the input electrical data signal into an output optical data signal. In other exemplary embodiments, multiple TOSAs and/or ROSAs can be employed in a single module.

Also located within the housing 102 can be a printed circuit board (PCB) (not shown). In one exemplary embodiment of the module 100, the PCB includes electrical connectors 112 (shown in phantom), located proximate a rear end 110 of the housing 102, which are configured and arranged to electrically and mechanically connect the module 100 to another device. The electrical connectors 112 can be any type of electrical connector that facilitates an electrical connection between the module 100 and the testing apparatus and/or other components with which the module 100 interfaces. Additionally, the electrical connectors 112 can be either a male, a female, or a universal (neither male or female) type connector.

In some instances, the OSAs 102 and 104, as well as the PCB, are individually tested and confirmed to be operating properly before final assembly and testing of the module 100. However, this need not be the case. Embodiments of the invention can be used to test any assembled module, as well as modules in various stages of assembly or completion. Alternately, other types of electrical or optical components that require testing over a temperature range can also be accommodated within the exemplary embodiments.

Figure 2A:
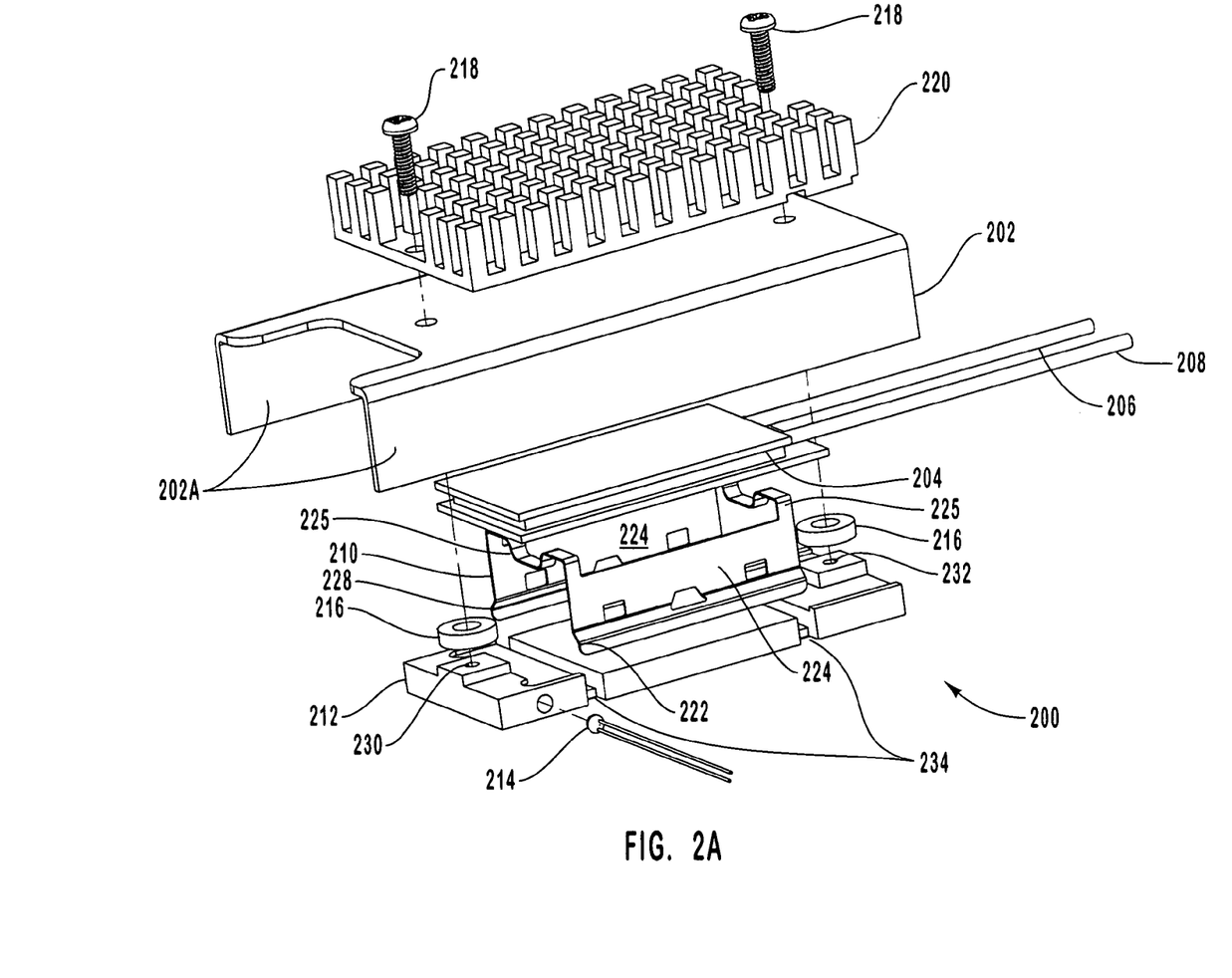
FIG. 2A is an exploded perspective view illustrating aspects of an exemplary implementation of a thermal testing assembly.

FIG. 2A illustrates various aspects of a thermal testing assembly 200 according to one embodiment of the present invention. Thermal testing assembly 200 includes a cover 202 that, among other things, isolates the assembly from the ambient air temperature. The thermal testing assembly 200 further includes a thermoelectric cooler (TEC) 204 that is located substantially within, and which is in thermal contact with the cover 202. Alternately, the TEC 204 can be attached to the cover 202. Immediately below, and attached to the TEC 204, can be a clip 210 designed to hold the thermal assembly 200 onto the cage housing the device under test (DUT). The thermal testing assembly 200 further includes a cover plate 212 that is secured against the optoelectronic device under test using the clip 210 and is simultaneously held in thermal contact with the TEC 204.

The cover 202 is substantially comprised of a thermally conductive material, such as metal, to enable heat transfer. Examples of such metals can include, but are not limited to, aluminum, aluminum alloys, copper, and/or copper alloys. The cover 202 exemplarily includes shield portions 202A that serve to at least partially isolate the TEC 204 from air currents or other influences that may compromise the performance of the thermal testing assembly 200. The geometry, positioning and orientation of the shield portions 202A are exemplary only. The shield portions 202A may, more generally, be implemented, arranged, and/or oriented in any fashion that a particular situation or application may require.

As noted earlier herein, the thermal testing assembly 200 includes the TEC 204 located substantially within, and attached to the cover 202. Electrical supply wires 206 and 208 can connect to the TEC 204 for connection with an electrical power source (not shown) for operation of the TEC 204. The TEC 204 serves to establish and maintain the DUT at a desired temperature. Examples of such DUTs can include, by way of example and not limitation, the module 100 (see FIG. 1), or any other electronic, optical or other configurations of optoelectrical or electrical devices. In some implementations, the TEC 204 is also employed to change the temperature of a given DUT. Depending on the manner in which current is supplied to the TEC 204, the TEC 204 may be employed to either heat or cool the DUT, or to maintain the DUT at a desired operational temperature, as discussed in more detail below.

The clip 210 enables the thermal testing assembly 200 to be removably attached to, for example, a cage assembly that holds the DUT. For instance, the clip 210 can include grooves 222 on arm portions 224 that receive and releasably hold a cage housing the DUT. Examples of such DUTs can include the module 100 (see FIG. 1), or any other electronic, optical or other device upon which thermal testing is to be conducted. Module 100 can be, by way of example and not limitation, an XFP module, an SFF module, an SFP module, an SFX module, an AT module, a GBIC module and/or other modules known to those of skill in the art.

The clip 210 is one structural implementation of a means for removably attaching the thermal testing assembly to a device to be tested. Accordingly, any other structure of comparable functionality may likewise be employed. For example, other mechanical fasteners, or clamps, may alternatively be employed. In yet other implementations, the thermal testing assembly 200 is simply held in position by gravity, without the use of mechanical attachment structures or adhesives.

The cover plate 212 can be used to hold the TEC 204 in thermal contact with the module 100. In this embodiment, the cover plate 212 can include one or more grooves 234. The grooves 234 allow corresponding connector pieces 225 on the clip 210 to recess within the cover plate 212. This allows the TEC 204 to rest generally flush against the cover plate 212, thus providing a large surface area for thermal contact. The cover plate 212 exemplarily includes a slab or sheet of metal, or other material having the desired thermal transmissive properties, to enable even heating and/or cooling, as applicable, of the DUT when the TEC 204 is activated. Accordingly, the cover plate 212 is configured and arranged for substantial thermal contact with TEC 204.

Among other things, the cover plate 212 facilitates measurement of the temperature of the DUT to within, for example, about 0.5 degrees Celsius. To this end, a thermal sensor 214 is provided. This sensor 214 connects the cover plate 212 with suitable temperature monitoring equipment (not shown). The information provided by this thermal sensor 214 is exemplarily employed as part of a feedback system for controlling the amount of current provided to the TEC 204. In this way, a precise amount of current can be provided to the TEC 204 to maintain a desired temperature. Alternately, the thermal sensor 214 can be integrated into the cover plate 212, the cover 202, or the TEC 204. In still other configurations, a thermal or temperature sensor can be independently mounted within the assembly 200.

The ability to control the TEC 204 in this way provides for a relative improvement in temperature control, as compared with typical testing methods, such as those that rely on an oven or similar device to establish and maintain a DUT at a desired temperature. Such control, in turn, enhances the quality, reliability and usefulness of the test data obtained in connection with thermal testing of the module or other component. Additionally, since no oven is used, it is much easier to cycle through numerous DUTs in a relatively short period of time. Since the TEC 204 is in thermal contact with the DUT, changing the temperature of the DUT is done much faster than with prior systems.

In this embodiment, washers 216 and mechanical fasteners 218, exemplarily implemented as screws, rivets or bolts, are provided that removably secure the cover 202, the TEC 204, the clip 210, and the cover plate 212 to each other, as generally indicated in FIG. 2, as the mechanical fastener 218 threadably engages with corresponding threaded holes 230 in the cover plate 212. It is understood that adhesives can also be used in addition to, or in place of, mechanical fasteners. Moreover, such mechanical fasteners may comprise metallic materials, or non-metallic materials such as nylon, or plastics. Using thermally conductive materials, such as metallic materials and certain ceramic material, reduces the overall thermal separation needed between the cover 202 and the cover plate 212. Additionally, elastomeric fasteners, such as a rubber band designed to withstand the temperatures within the desired test range, can also be used to hold the components in a fixed relationship with respect to each other.

With continuing reference to FIG. 2A, at least some implementations of the thermal testing assembly 200 further include a heat sink 220, that can be made from a thermally conductive material, such as metal for example, that is positioned on top of the cover 202 to enable heat dissipation.

Figure 2B:
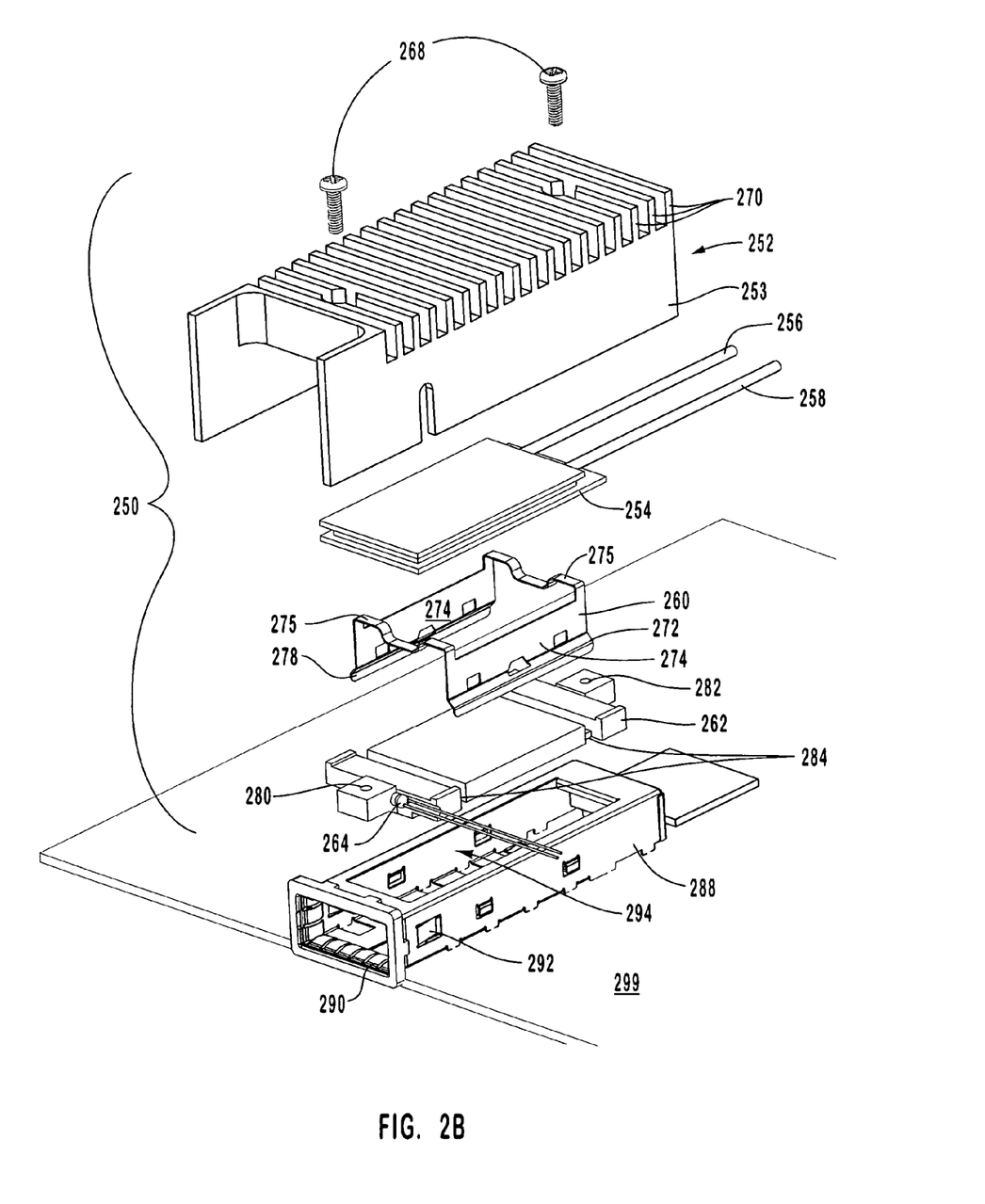
FIG. 2B is an exploded perspective view illustrating aspects of an alternate exemplary implementation of a thermal testing assembly.

In alternate embodiments, the heat sink 220 is attached to the cover 202 using chemical or mechanical fasteners. In yet other embodiments, one example of which is shown in FIG. 2B, the heat sink 220 and cover 202 can be formed as an integrated unit. Various types of metals, including, but not limited to, aluminum and aluminum alloys, may be employed in the construction of the heat sink 220, but any other suitable metals or other thermally conductive materials may alternatively be employed. Aspects of the heat sink 220 such as, but not limited to, heat transfer area, size, geometry, positioning, and orientation may be varied as necessary to suit the requirements of a particular application. Accordingly, the scope of the invention should not be construed to be limited to the exemplary heat sink implementations disclosed herein.

One alternate exemplary embodiment of a thermal testing assembly is shown in FIG. 2B, and designated generally with reference numeral 250. Thermal testing assembly 250 includes a cover 252 that, among other things, isolates the assembly from the ambient air temperature. The thermal testing assembly 250 further includes a thermoelectric cooler (TEC) 254 that is located substantially within, and which is in thermal contact with the cover 252. Alternately, the TEC 254 can be attached to the cover 252. In the illustrated configuration, there can be a clip 260 located below and attached to the TEC 254. The clip 260 can be designed to hold the thermal assembly 250 onto a cage assembly 288 housing the device under test (DUT). The thermal testing assembly 250 further includes a cover plate 262 that is secured against the optoelectronic device under test using the clip 260 and is simultaneously held in thermal contact with the TEC 254.

In this exemplary embodiment, the cover 252 can be designed as a unitary piece that includes a heat sink, including a plurality of heat dissipating fins 270. The cover 252 can be substantially comprised of a thermally conductive material, such as metal, to enable heat transfer. Examples of such metals can include, but are not limited to, aluminum, aluminum alloys, copper, and/or copper alloys. The cover 252 exemplarily includes shield portions 253 that serve to at least partially isolate the TEC 254 and cage assembly 288 from air currents or other influences that may compromise the performance of the thermal testing assembly 250. The geometry, positioning and orientation of the shield portions 253 are exemplary only. The shield portions 253 may, more generally, be implemented, arranged, and/or oriented in any fashion that a particular situation or application may require.

As noted earlier herein, the thermal testing assembly 250 includes the TEC 254 located substantially within, and attached to the cover 252. Electrical supply wires 256 and 258 can connect to the TEC 254 for connection with an electrical power source (not shown) for operation of the TEC 254. The TEC 254 serves to establish and maintain the DUT at a desired temperature. Examples of such DUTs can include, by way of example and not limitation, the module 100 (see FIG. 1), or any other electronic device, optical device, or other configurations of optoelectrical or electrical devices. Module 100 can be, by way of example and not limitation, an XFP module, an SFF module, an SFP module, an SFX module, an AT module, a GBIC module and/or other modules known to those of skill in the art.

In the embodiment illustrated in FIG. 2B, the cage 288 is designed to receive an XFP module. In some implementations, the TEC 254 is also employed to change the temperature of a given DUT. Depending on the manner in which current is supplied to the TEC 254, the TEC 254 may be employed to either heat or cool the DUT, or to maintain the DUT at a desired operational temperature, as discussed in more detail below.

The clip 260 enables the thermal testing assembly 250 to be removably attached to the cage assembly 288. For instance, the clip 260 can include grooves 272 on arm portions 274 that receive and releasably hold the cage assembly 288 that houses the DUT. Examples of such DUTs can include the module 100 (see FIG. 1), or any other electronic, optical or other device upon which thermal testing is to be conducted.

The cover plate 262 can be used to hold the TEC 254 in thermal contact with the module 100 when the module 100 is inserted into the cage assembly 288. In this embodiment, the cover plate 262 can include one or more grooves 284. The grooves 284 allow corresponding connector pieces 275 on the clip 260 to recess within the cover plate 262. This allows the TEC 254 to rest generally flush against the cover plate 262, thus providing a large surface area for thermal contact. The cover plate 262 exemplarily includes a slab or sheet of metal, or other material having the desired thermal transmissive properties, to enable even heating and/or cooling, as applicable, of the DUT when the TEC 254 is activated. Accordingly, the cover plate 262 can be configured and arranged for substantial thermal contact with TEC 254.

Among other things, the cover plate 262 facilitates measurement of the temperature of the DUT to within, for example, about 0.5 degrees Celsius. To this end, a thermal sensor 264 can be provided. This sensor 264 connects the cover plate 262 with suitable temperature monitoring equipment (not shown). The information provided by this thermal sensor 264 can be exemplarily employed as part of a feedback system for controlling the amount of current provided to the TEC 254. In this way, a precise amount of current can be provided to the TEC 254 to maintain a desired temperature. Alternately, the thermal sensor 264 can be integrated into the cover plate 262, the cover 252, or the TEC 254. In still other configurations, a thermal or temperature sensor can be independently mounted within the assembly 250.

As with the system shown in FIG. 2A, the ability to control the TEC 254 in this way provides for a relative improvement in temperature control, as compared with typical testing methods, such as those that rely on an oven or similar device to establish and maintain a DUT at a desired temperature. Such control, in turn, enhances the quality, reliability and usefulness of the test data obtained in connection with thermal testing of the module or other component. Additionally, since no oven is used, it is much easier to cycle through numerous DUTs in a relatively short period of time. Since the TEC 254 is in thermal contact with the DUT, changing the temperature of the DUT can be achieved much faster than with prior systems.

In this embodiment, mechanical fasteners 268, exemplarily implemented as screws, rivets or bolts, are provided that removably secure the cover 252, the TEC 254, the clip 260, and the cover plate 262 to each other, as generally indicated in FIG. 2B, as the mechanical fastener 268 threadably engages with corresponding threaded holes 280 and 282 in the cover plate 262. It is understood that adhesives can also be used in addition to, or in place of, mechanical fasteners. Moreover, such mechanical fasteners may comprise metallic materials, or non-metallic materials such as nylon, or plastics. Using thermally conductive materials, such as metallic materials and certain ceramic material, reduces the overall thermal separation needed between the cover 252 and the cover plate 262. Additionally, elastomeric fasteners, such as a rubber band designed to withstand the temperatures within the desired test range, can also be used to hold the components in a fixed relationship with respect to each other.

The cage 288 can be mounted to a substrate 299. In some embodiments, substrate 299 can be a PCB that includes other circuitry for use in the operation of the test equipment. The cage 288 can include an opening 290 designed to accommodate a particular type of electronic or optoelectronic module. Examples of such modules can include an XFP module, an SFF module, an SFP module, an SFX module, an AT module, a GBIC module and/or other modules known to those of skill in the art. The cage 288 can also include one or more windows 292 that allow various electrical or other connections to exit an interior 294 of the cage 288. In one assembled configuration, the cover plate 262 can be recessed within the interior 294 of the cage 288, such that when a DUT is inserted into the opening 290, thermal contact is established and maintained between the DUT and the TEC 254 through the cover plate 262.

Figure 3:
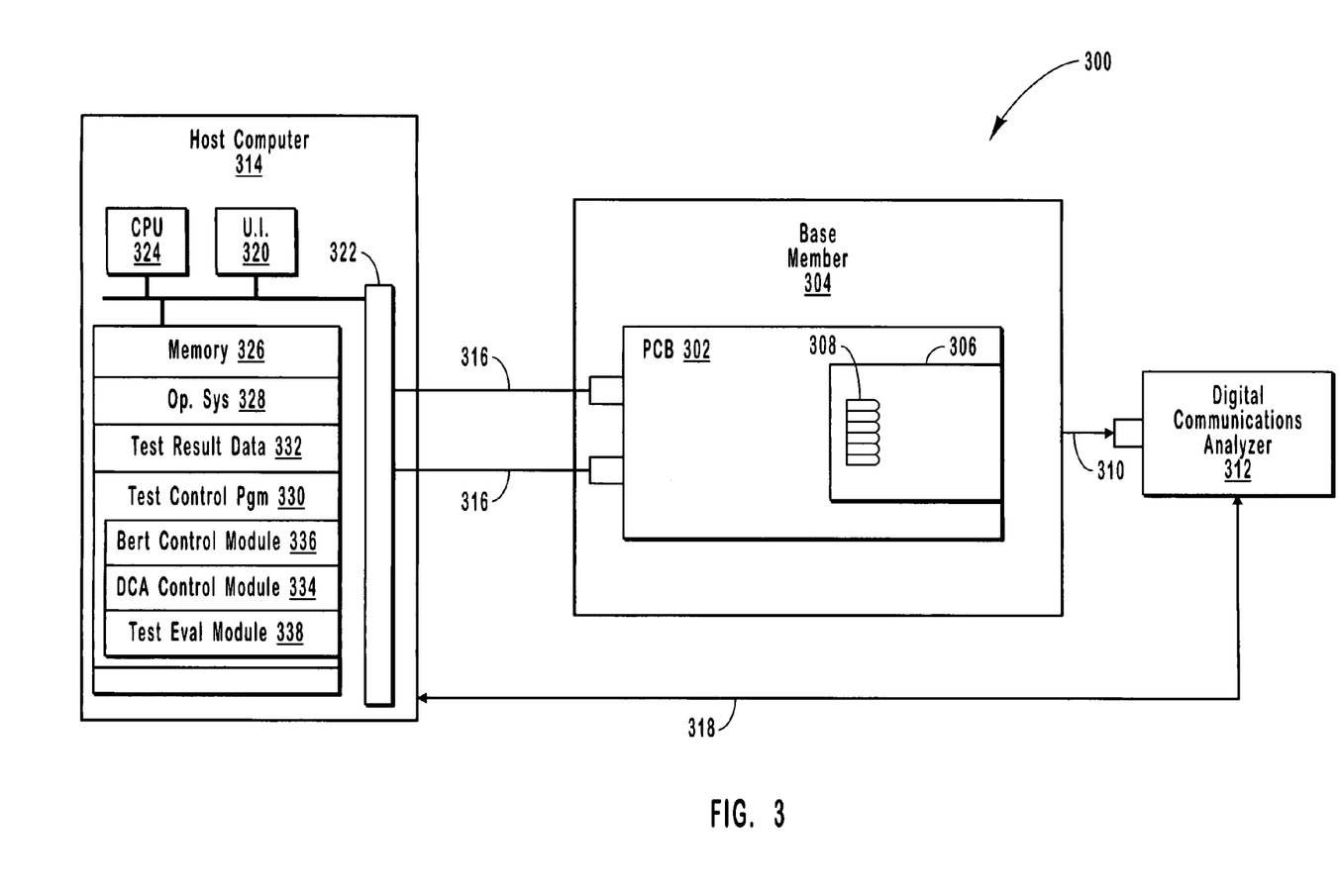
FIG. 3 is a block diagram illustrating aspects of an exemplary optoelectronic transceiver module test system.
Figure 4:
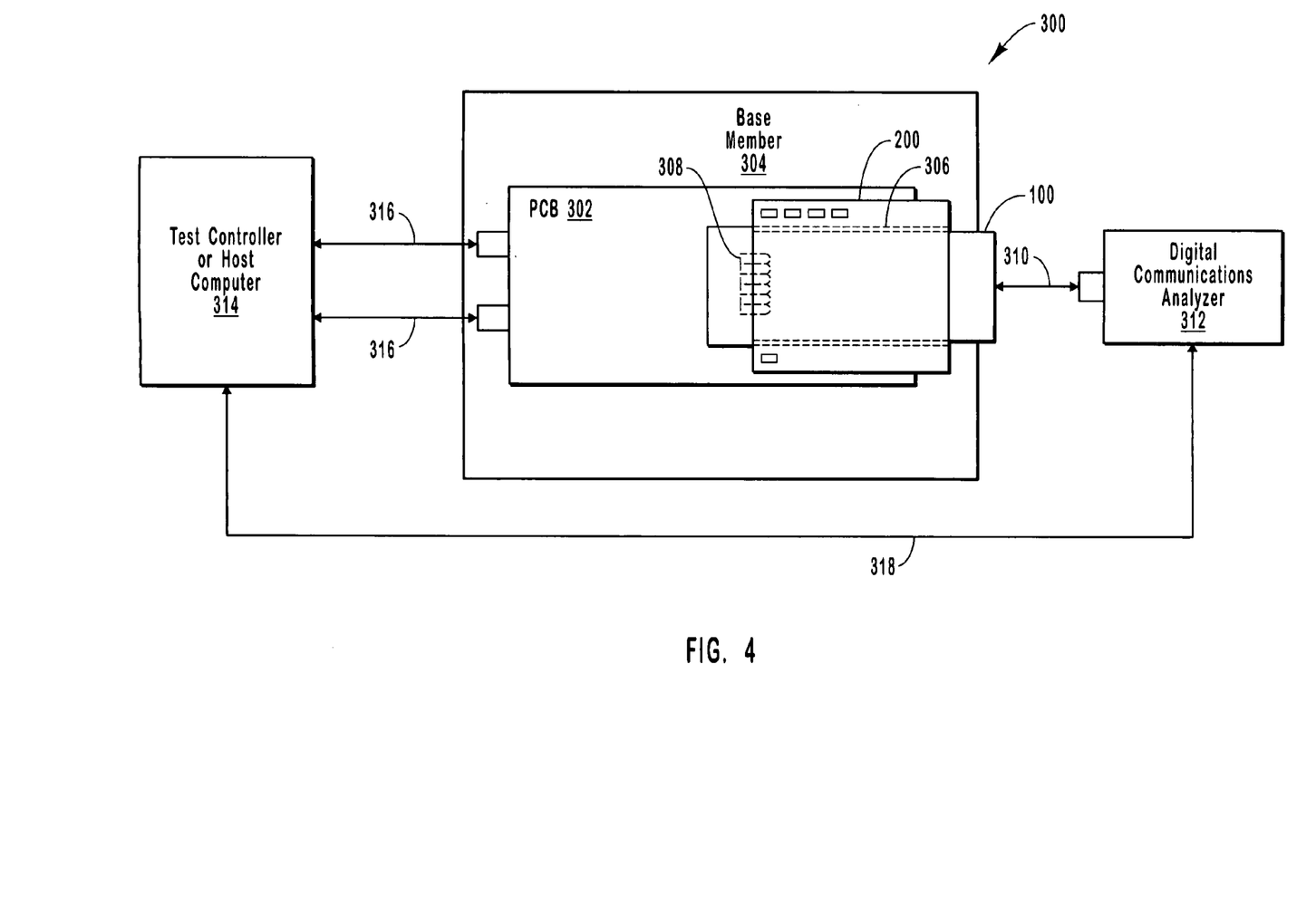
FIG. 4 is a block diagram of the exemplary optoelectronic transceiver module test system of FIG. 3 showing a module in a testing position.

Directing attention now to FIGS. 3 and 4, details are provided concerning aspects of a module test system 300 such as may be employed in connection with implementations of thermal testing assemblies 200 and 250 (see, e.g., FIGS. 2A and 2B). In the illustrated implementation, the module test system 300 includes a PCB 302 mounted on a base member 304. Attached to the base member 304 is a cage 306 that is sized and configured to securely and removably receive a device, such as an optoelectronic module. A connector 308 located proximate the cage 306 enables the DUT (not shown) to electrically and mechanically interface with circuitry disposed on the PCB 302. A connection 310, such as an optical fiber for example, enables output from the DUT to be directed to a digital communications analyzer (DCA) 312, or other devices of comparable functionality.

As discussed in further detail below, control of the DUT test system 300 and the thermal test system 200 is generally implemented in connection with a host computer 314 configured to communicate with the DUT by way of a bus 316 and the connector 308, and also to communicate with the DCA 312 (or other devices) by way of bi-directional bus 318. Among other things, the host computer 314 causes transmission of test signals, which may also be referred to herein as "test data patterns," to the optoelectronic module, or other DUT, so that the response of the device, exemplified as an output signal, can be evaluated and corresponding adjustments implemented if necessary. As discussed in further detail elsewhere herein, the thermal testing assembly 200 and the host computer 314 enable testing of various components of the module 100, such as, but not limited to, the ROSA and/or TOSA, over a range of thermal conditions. In alternate embodiments, no host computer is required, and testing can be accomplished manually using, for example, the analyzer 312, or any other equipment capable of generating the electrical/optical signal initially sent to the transceiver.

In one testing evolution, a test data pattern is transmitted to an OSA which, in the case of a TOSA for example, converts the test data pattern into an optical signal. The output optical signal is then analyzed for conformance with various standards in order to determine the effect(s) of the imposed thermal conditions on the performance of the device. This will be discussed in more detail below with reference to FIG. 6.

In the illustrated implementation, host computer 314 includes a user interface 320 which generally enables a user to input programming and/or other instructions, and also allows a user to access information concerning testing evolutions, setups and processes. The user interface 320 may be implemented, for example, as a graphical user interface (GUI) or other suitable user interface. The host computer 314 further includes one or more interfaces 322 for connection to the PCB 302, and also can include a central processing unit (CPU) 324 and a memory 326. In this exemplary implementation, the memory 326 includes high speed random access memory (RAM) as well as nonvolatile mass storage, such as one or more magnetic disk storage devices. In other implementations, the memory 326 additionally, or alternatively, includes mass storage that is remotely located from central processing unit(s) 324. The memory 326 exemplarily includes a suitable operating system 328, a test control program 330 and a test result database 332, as well as other systems and programs.

The host computer 314 can be a special purpose or general purpose computer that includes various computer hardware, as discussed in greater detail below. Embodiments within the scope of the present invention can also include computer-readable media for carrying or having computer-executable instructions or electronic content structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or electronic content structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and content which cause a general purpose computer, special purpose computer, or special purpose processing device to perform a certain function or group of functions.

Although not required, aspects of the invention are described herein in the general context of computer-executable instructions, such as program modules, being executed by computers in network environments. Generally, program modules include routines, programs, objects, components, and content structures that perform particular tasks or implement particular abstract content types. Computer-executable instructions, associated content structures, and program modules represent examples of the program code means for executing steps of the methods disclosed herein. The particular sequence of such executable instructions or associated content structures represents examples of corresponding acts for implementing the functions described in such steps.

Of course, exemplary embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment for example, program modules may be located in both local and remote memory storage devices. Alternately, exemplary embodiments of the present invention can be practiced in a stand alone system configuration.

Returning to FIG. 3, the operating system 328 generally includes instructions for performing functions such as, but not limited to, communicating, processing data, accessing data, analyzing data, storing data, and searching data. The test control program 330 generally defines, and causes the execution of, various thermal tests and exemplarily includes a DCA control module 334, a bit error rate tester ("BERT") control module 336, and a test data evaluation module 338. In this exemplary configuration, the host computer 314 has the ability to generate and/or receive a test electrical signal.

Directing particular attention now to FIG. 4, and with continuing attention to FIG. 3, an arrangement of the module test system 300 shows the exemplary module 100 operably received in the cage 306 (shown partially in phantom) and the thermal testing assembly 200 positioned over the cage 306. Note that in some alternative implementations, no cage 306 is provided. However, the cage 306 is desirable in at least some cases because the cage 306 facilitates a secure connection between the electrical connector 112 (see FIG. 1) of the module 100 and the connector 308. The cage 306 also facilitates a secure connection between the thermal test assembly 200 and the module 100. The clip 210 (FIG. 2) can be designed to fasten onto the cage 306 creating optimal thermal connection between the entire assembly 200 and the module 100. In some alternative implementations, the thermal testing assembly 200 is placed directly on the device to be tested.

As noted earlier herein, the module test system 300 can include an optical test pattern generator. Analysis of the test data pattern for compliance with operating requirements may be performed manually by viewing a scope, such as the DCA 312, that graphically displays the output signal of the DUT. Alternately, this analysis can be performed automatically by the host computer 314, or other devices suitable to that purpose. This, and similar analyses, enable the user to identify the effect of the thermal test conditions on the data stream output by the test device. Aspects of the testing evolution can then be modified, if desired, such as by communication of instructions to the host computer 314 by the test operator. Specific examples of methods and procedures for use of the module test system 300 with the thermal testing assembly 200 are discussed below in connection with FIG. 6.

Generally, the host computer 314 controls the test data conditions, as well as the functioning of the test pattern generator and the DCA 312. With reference to the illustrated implementation of FIG. 4, an electrical test signal is fed from the host computer 314 to, for example, a TOSA port of the module 100, by way of the PCB 302, the bus 316, and the connector 308. The TOSA converts the electrical test signal to an output optical signal which is then transmitted from the module 100 through an optical fiber 310 and is received by the DCA 312, electrically coupled to the host computer 314 by way of the bi-directional bus 318. The DCA 312 analyzes the test signal for compliance with operating requirements, and transmits the results of its analysis to the host computer 314.

In some implementations, the host computer 314 can adjust one or more aspects of the test, based upon results of the analyses performed by the DCA 312 or by the host computer 314. For example, the host computer 314 can adjust the electronics on the PCB 302 of the module 100, thus changing the performance of the TOSA and/or ROSA until they function properly. The host computer 314 also performs additional analyses in some implementations. By way of example, test data can be gathered at another operating temperature, or over a range of operating temperatures, and sent to the host computer 314 for analysis and evaluation. The test data results can then be stored in the host computer 314 for later use.

Figure 5:
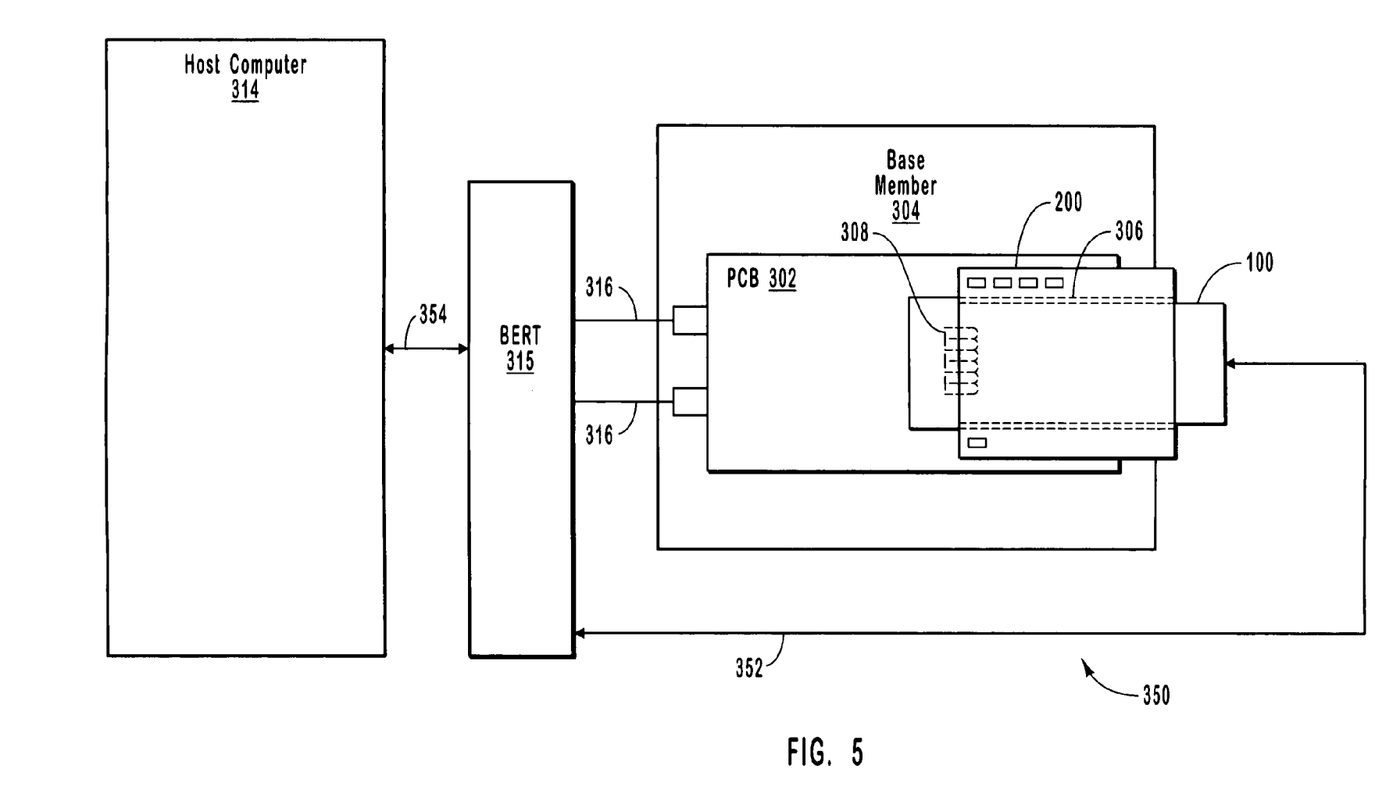
FIG. 5 is a block diagram of another exemplary embodiment of an optoelectronic transceiver module test system showing a module in a testing position.
Figure 6:
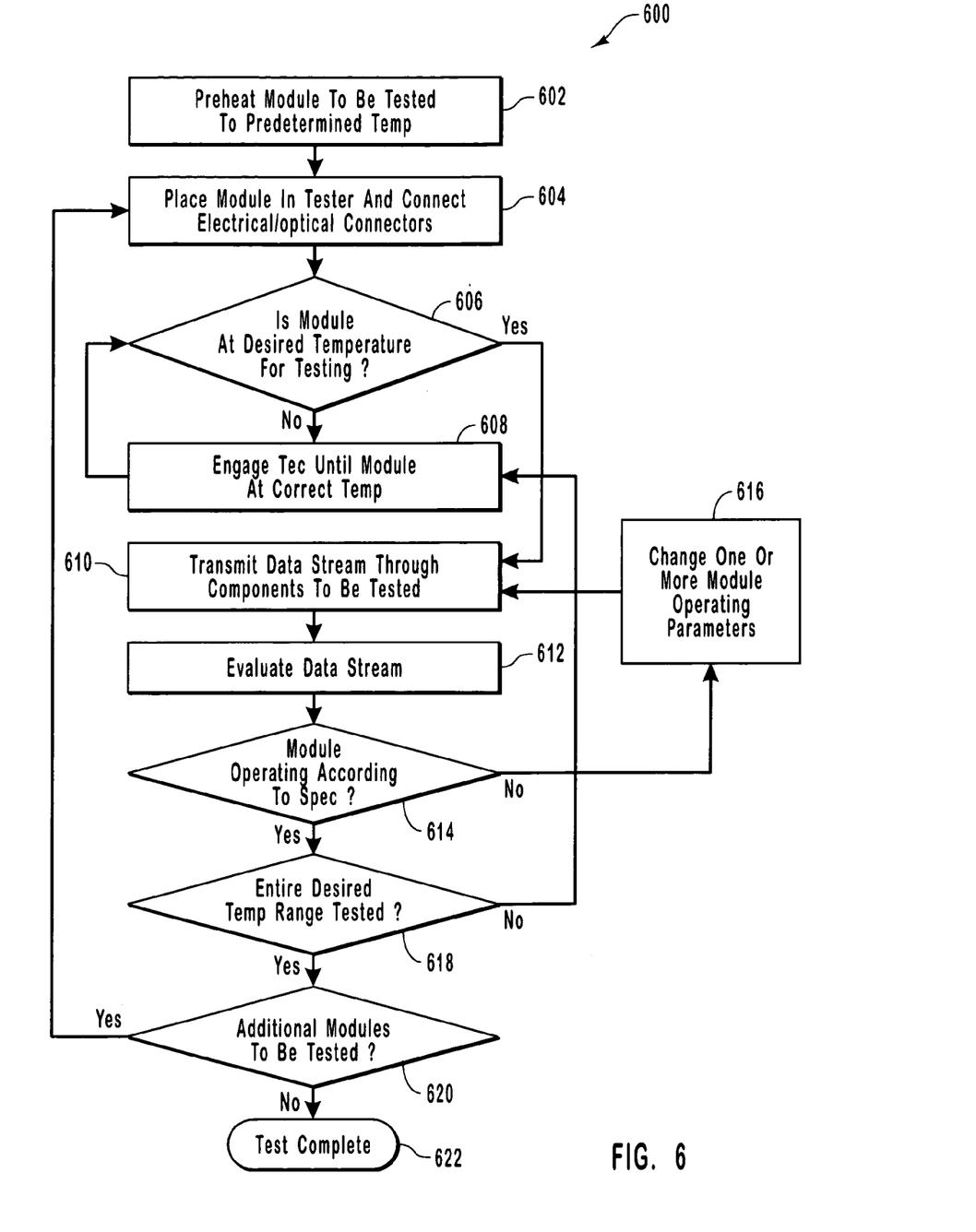
FIG. 6 is a flowchart illustrating aspects of an exemplary method for thermal testing of an optical component of an optoelectronic transceiver.

Details concerning the conduct of one testing method are provided with reference to FIG. 6. In general, test result data is received from the module 100, by way of the DCA 312, and stored in the test result database 332 of FIG. 3. With continued reference to FIG. 3, the test control program 330 and the DCA control module 334 include computer programs and/or instructions for controlling the operation of and for receiving test result data from, the DCA 312. The test evaluation module 338 includes instructions for evaluating the test result data to determine whether the optical component is functioning properly under the imposed thermal conditions. Note that in one alternative implementation of the module test system 300, discussed below in connection with FIG. 5, a BERT is used to implement at least some of the functions implemented in connection with the DCA 312 illustrated in FIGS. 3 and 4

With attention now to FIG. 5, details are provided concerning an alternate implementation, designated as reference numeral 350, of the module test system shown in FIG. 3. As the implementation of the module test system illustrated in FIG. 5 is similar in many regards to that illustrated in FIG. 3, the following discussion of FIG. 5 will focus primarily on selected aspects of the embodiment illustrated there.

In contrast with the implementation of the module test system shown in FIG. 3, the implementation illustrated in FIG. 5 employs a BERT 315 rather than the DCA 312. In this exemplary embodiment, the host computer 314 controls the operation of the BERT 315 by way of the BERT control module 336 (see FIG. 3) and a bi-directional bus 354.

Generally, the BERT 315 generates and transmits test data patterns to the DUT in response to instructions received from the host computer 314. As noted above, the DUT generates and transmits a corresponding output signal. In the illustrated embodiment, the signal generated and transmitted by the DUT is directed to the BERT 315, which then analyzes the output signal of the device to determine a bit error rate (BER) associated with the DUT undergoing the testing. Alternately, the signal generated by the DUT can be sent directly to the host computer 314, using an appropriate hardware interface. The host computer 314 then performs the analysis of the signal.

The measured BER can then be used to evaluate the effect of various thermal conditions on the performance of the DUT. It should be noted however that the scope of the invention is not limited for use in connection with the BER performance parameter. More generally, embodiments of the invention may be employed in connection with any other performance parameter(s) that provide(s) a measure of performance or response of the DUT as a function, whether direct or indirect, of the thermal condition(s) to which the device is subjected. Such other parameters can include, by way of example and not limitation, analysis by the DCA of the electrical signal outputted from the ROSA, use of a Jitter tester to ensure proper behavior, and/or use of a network analyzer to ensure proper behavior within a system Use of the module test system 350 to test a ROSA, for example, is similar to the testing of a TOSA as discussed above with reference to FIG. 4. An optical test pattern generator, such as the BERT 315, having an optical transmitter at its output port, is configured to transmit test signal transmissions to the module 100 via a fiber optic connection 352. In some implementations, the fiber optic connection 352 takes the form of two fiber optic lines, one for transmission and one for reception. The BERT 315 is connected via the bus 316 to the PCB 302. The BERT 315 is also connected to the host computer 314 for transmitting and receiving test data and commands via the bi-directional bus 354.

The host computer 314 controls the test data conditions as well as the functioning of the optical test pattern generator. An optical test pattern is fed from the BERT 315 to, for example, the ROSA of the module 100, via the fiber optic connection 352. The ROSA then converts the input test pattern to an electrical output signal which is then transmitted to the BERT 315 via the PCB 302 and the bus 316. The BERT 315 passes this signal on to the host computer 314, by way of the bus 354, and the host computer 314 then analyzes the received signal in conjunction with data received from the BERT 315 for compliance with pre-programmed operating requirements. Alternately, additional modules within the BERT 315 can conduct the analysis and send the results to the host computer 314.

Based upon the analysis of the test results, the host computer 314 then transmits commands to the BERT 315 for further adjustment of the control parameters, such as repeating the testing over a range of module temperatures, if necessary. The test data results can then be stored in the host computer 314 for later use. Alternately, the test data results can be transmitted to a remote location via a network or other connection with the host computer 314. In addition, the host computer 314 may send commands to the PCB 302 to adjust the performance of the ROSA portion of the module 100 or to adjust other operating parameters of the PCB 302 or the TEC 204 (see FIG. 2), and/or other components associated with the module test system and/or the thermal testing assembly. It should be noted that the scope of the present invention is not limited to the exemplary layout of circuits and testing apparatuses disclosed herein.

With attention now to FIG. 6, details are provided concerning aspects of one embodiment of a thermal testing method, denoted generally as reference numeral 600. In the illustrated implementation, the process 600 commences by preheating the optoelectronic module to be tested to a predetermined temperature, as represented by block 602. This preheat process reduces the time required to conduct the test since preheating can often be implemented relatively more quickly with systems and devices other than the thermal testing assembly. In other implementations however, no preheating is performed.

Following preheating, the module 100 can be positioned on the test board and can be electrically and optically connected to the elements of the module test system, as disclosed elsewhere herein and represented by block 604. In one embodiment, module 100 is positioned within the cage 306 (FIGS. 4 and 5). Upon mounting the module 100, the sensor measures the temperature of the module casing, and sends this data to the operator, and/or the host controller and host computer, to determine if the module 100 has reached the desired temperature, as represented by decision block 606. If the module is at the desired test temperature, as represented by decision block 606 being in the affirmative, the process 600 advances to transmit a test data stream or data pattern to the module 100, as represented by block 610. If, on the other hand, the module is not at the desired test temperature, the process 600 advances to stage 608 where the TEC of assembly 200 is energized until the module attains the desired test temperature.

In either case, the module ultimately receives the test data stream and generates and transmits a corresponding output data stream to a device such as the host computer, DCA or BERT. At stage 612 of the process 600, this output data stream is evaluated. Among other things, this evaluation process ensures that the module is operating within acceptable operating parameters. These operating parameters can be, by way of example and not limitation, those specified by the current XFP Multi-Source Agreement (MSA) Specification, SONET OC-192 SR-1 and SDH STM I-64.1 specifications, as well as the 10-Gigabit Ethernet, IEEE 802.3ae, 10 GBASE-LR/LW, and 10G Fibre Channel specifications. Any other predefined specification can also be used, whether or not such specification includes predefined operating parameters defined by the standards outlined above.

The process then advances to decision point 614, where it is determined whether or not the module is operating within acceptable parameters. If the module is not operating within acceptable parameters, then one or more of the module operating parameters can be changed, as shown in stage 616. The process then returns to stage 610, and a new data stream is transmitted. After evaluation of the output data stream has been completed, and the module is operating within acceptable specifications, the process 600 advances to decision point 618 where a determination is made as to whether or not the entire range of temperatures has been tested. If not, the process 600 returns to stage 608. If the entire range of temperatures has been tested, the process advances to stage 620 where a determination is made as to whether there are additional modules to be tested. If further modules are to be tested, the process 600 returns to stage 604. On the other hand, if there are no further modules to be tested, testing is then complete and the process 600 terminates at stage 622.

Exemplary embodiments of the present invention allow for testing of optoelectronic devices over a wide temperature range. In one exemplary implementation, the module test system tests modules or other components over a range of about 15° C. to about 90° C. and/or at discrete temperatures within that range. In one exemplary embodiment, optoelectronic transceiver modules are tested over a range of about 25° C. to about 71° C. The foregoing are exemplary test conditions only however and, more generally, any of a variety of other thermal test conditions may be defined and employed. For example, a range of about −40° C. to about 100° C. can be used. Further, aspects of thermal testing such as, but not limited to, range of temperatures, duration of thermal test, thermal cycling, and thermal gradients may be varied as necessary to suit the requirements of a particular application or module.

The thermal testing assemblies of the present invention enable full data rate testing of optoelectronic devices, such as transceivers, at data rates ranging from, for example, about 1 Gb/s to about 11 Gb/s. Such testing helps to ensure that transceivers that are shipped to customers will perform as specified, thus greatly reducing module failures and increasing customer satisfaction.

The test devices, systems and methods outlined herein provide many advantages over prior systems and methods. Since the entire test apparatus is not heated in an oven, failure of the test system electrical circuits is no longer a problem. The accuracy of the test temperature is increased, since the module test temperature can now be measured to within, for example 0.5° C. In alternate embodiments, depending on the equipment used, the module test temperature can be measured and/or adjusted to within 0.05° C. Since only the module is heated, changing the test temperature of the module also occurs more quickly and the corresponding temperatures are more accurate and constant. Additionally, it is now much easier and faster to test additional modules over the desired temperature range.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A thermal testing assembly comprising:
   a frame;
   a thermoelectric cooler in thermal contact with said frame;
   a cover plate in thermal contact with the thermoelectric cooler; and
   means for removably attaching the thermal testing assembly to a device under test (DUT), the means for removably attaching the thermal testing assembly to the DUT being at least partially disposed between the thermoelectric cooler and the DUT.

2. The thermal testing assembly of claim 1, wherein said means for removably attaching comprises a clip configured to removably engage at least one of said DUT and a cage within which said DUT is at least partially received.

3. The thermal testing assembly of claim 1, wherein said means for removably attaching comprises a thermally conductive material that forms a temporary bond between said thermal testing assembly and said DUT.

4. The thermal testing assembly of claim 1, further comprising a heat sink in at least indirect thermal contact with said thermoelectric cooler.

5. The thermal testing assembly of claim 1, further comprising a thermal sensor configured and arranged to measure, at least indirectly, a temperature of said DUT.

6. The thermal testing assembly of claim 1, wherein said DUT is one of an SFF module, an SFP module, an SFX module, an AT module, a GBIC, and an XFP module.

7. The thermal testing assembly of claim 1, wherein said cover plate comprises a thermal conductive material and wherein said cover plate is attached at least indirectly to said DUT.

8. The thermal testing assembly of claim 1, wherein said cover plate is at least partially disposed within the means for removably attaching the thermal testing assembly to the DUT.

9. The thermal testing assembly of claim 2, wherein the clip comprises a plurality of arm portions configured to attach to the DUT or the cage.

10. The thermal testing assembly of claim 9, wherein the arm portions of the clip include grooves configured to receive and releasably hold the cage.

11. The thermal testing assembly of claim 2, wherein the cover plate includes one or more grooves and the clip includes one or more connector pieces recessed within the grooves.

12. The thermal testing assembly of claim 11, wherein the thermoelectric cooler rests generally flush against the cover plate.

* * * * *

UNITED STATES PATENT AND TRADEMARK OFFICE
CERTIFICATE OF CORRECTION

PATENT NO. : 7,260,303 B2  Page 1 of 1
APPLICATION NO. : 11/027765
DATED : August 21, 2007
INVENTOR(S) : Bench et al.

It is certified that error appears in the above-identified patent and that said Letters Patent is hereby corrected as shown below:

Column 3
Line 38, change "perspective schematic view" to --perspective view--

Column 5
Line 1, change "102 and 104" to --104 and 106--

Column 6
Line 50, change "holes 230" to --holes 230 and 232--

Signed and Sealed this

Thirtieth Day of March, 2010

David J. Kappos
*Director of the United States Patent and Trademark Office*